(12) United States Patent
Adrian et al.

(10) Patent No.: US 9,430,150 B2
(45) Date of Patent: Aug. 30, 2016

(54) POWER CONTROL FOR DATA STORAGE DEVICES AND METHOD THEREFOR

(71) Applicant: Dell Products, LP, Round Rock, TX (US)

(72) Inventors: Jason D. Adrian, Cedar Park, TX (US); Kevin W. Mundt, Austin, TX (US); Cyril Keilers, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 500 days.

(21) Appl. No.: 13/751,988

(22) Filed: Jan. 28, 2013

(65) Prior Publication Data

US 2014/0215231 A1 Jul. 31, 2014

(51) Int. Cl.
| | |
|---|---|
| G06F 1/26 | (2006.01) |
| G06F 3/06 | (2006.01) |
| G06F 1/32 | (2006.01) |
| G06F 11/30 | (2006.01) |
| G06F 11/32 | (2006.01) |

(52) U.S. Cl.
CPC ........... *G06F 3/0601* (2013.01); *G06F 3/0625* (2013.01); *G06F 3/0634* (2013.01); *G06F 3/0674* (2013.01); *G06F 1/3203* (2013.01); *G06F 11/3034* (2013.01); *G06F 11/326* (2013.01); *Y02B 60/1246* (2013.01)

(58) Field of Classification Search
CPC ....................................................... G06F 1/266
USPC ........................................................ 713/310
See application file for complete search history.

(56) References Cited

U.S. PATENT DOCUMENTS

| | | | | |
|---|---|---|---|---|
| 4,980,836 | A * | 12/1990 | Carter et al. .................. | 713/322 |
| 6,295,609 | B1 * | 9/2001 | Cargemel ............... | H02H 3/087 |
| | | | | 711/114 |
| 6,370,565 | B1 * | 4/2002 | Van Gong ............... | A63F 13/12 |
| | | | | 709/205 |
| 6,628,469 | B1 | 9/2003 | Hoyt | |
| 6,714,887 | B1 * | 3/2004 | Wong et al. .................. | 702/115 |
| 6,745,341 | B1 * | 6/2004 | Onitsuka et al. .............. | 714/6.3 |
| 2002/0191537 | A1 * | 12/2002 | Suenaga ............. | G06F 11/0727 |
| | | | | 370/221 |
| 2003/0005367 | A1 * | 1/2003 | Lam ..................... | G06F 11/0727 |
| | | | | 714/42 |
| 2003/0093721 | A1 * | 5/2003 | King .................... | G11B 25/043 |
| | | | | 714/42 |
| 2004/0153685 | A1 * | 8/2004 | Tuttle ........................ | H04L 1/22 |
| | | | | 714/1 |
| 2005/0288562 | A1 | 12/2005 | Feliss et al. | |
| 2006/0075188 | A1 * | 4/2006 | Matsushige et al. ......... | 711/114 |
| 2007/0222296 | A1 | 9/2007 | Price et al. | |
| 2008/0089022 | A1 | 4/2008 | Cheung et al. | |
| 2008/0120518 | A1 * | 5/2008 | Ritz ..................... | G06F 11/2025 |
| | | | | 714/3 |
| 2009/0119526 | A1 * | 5/2009 | Liu et al. ....................... | 713/323 |
| 2009/0289501 | A1 | 11/2009 | Garb | |
| 2011/0099395 | A1 | 4/2011 | Richards, III | |

(Continued)

OTHER PUBLICATIONS

"Storage Bridge Bay (SBB) Specification, Version 2.1," Storage Bridge Bay Working Group, Inc. 2011, http://www.sbbwg.org/sbb_specification/SBB_Specification_Version_2_1.pdf.

*Primary Examiner* — Chun Cao
*Assistant Examiner* — Volvick Derose
(74) *Attorney, Agent, or Firm* — Larson Newman, LLP

(57) ABSTRACT

A data storage system includes a data storage controller, a data storage device, and a logic circuit. The logic circuit receives hard drive status information from the data storage controller. The information is communicated by a first status signal and a second status signal. The logic circuit provides a power control signal to the data storage device based on a logic state of the first status signal and a logic state of the second status signal.

20 Claims, 3 Drawing Sheets

(56) References Cited

U.S. PATENT DOCUMENTS

| | | | |
|---|---|---|---|
| 2011/0161729 A1* | 6/2011 | Ritz | G06F 9/5077 714/13 |
| 2011/0197079 A1* | 8/2011 | Ejiri | 713/300 |
| 2011/0231674 A1* | 9/2011 | Stuhlsatz | G06F 1/3203 713/300 |
| 2013/0080697 A1* | 3/2013 | Dhandapani | G06F 11/3034 711/114 |
| 2013/0124879 A1* | 5/2013 | Zhang et al. | 713/300 |
| 2013/0219248 A1* | 8/2013 | Sakurai | 714/766 |

* cited by examiner

POWER CONTROL FOR DATA STORAGE DEVICES AND METHOD THEREFOR

FIELD OF THE DISCLOSURE

This disclosure generally relates to information handling systems, and more particularly relates to power control for data storage devices.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, networking systems, and data storage systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
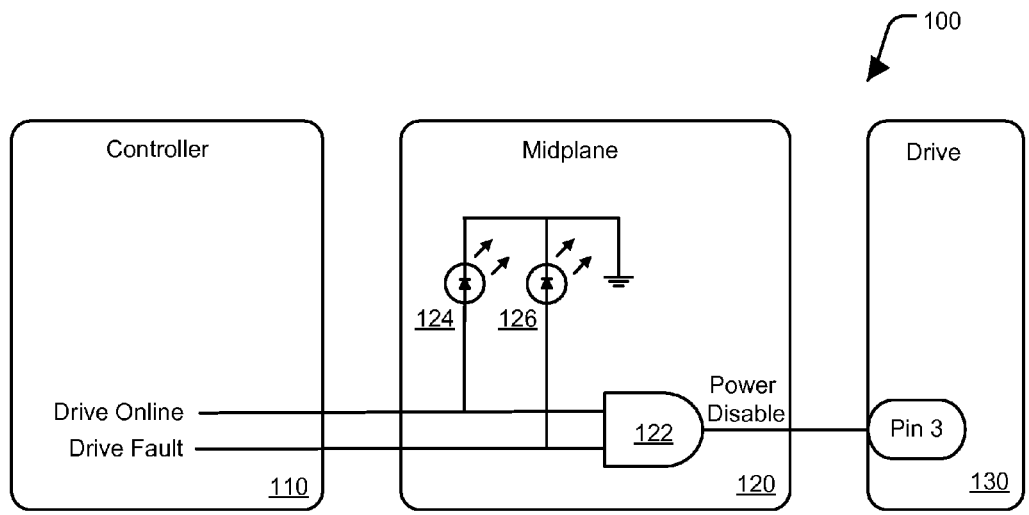
FIG. 1 is a block diagram illustrating a data storage system according to a specific embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

FIGS. 1-4 show techniques for providing a power control signal to a data storage device. The power control signal is generated based on hard drive status indicators provided by a data storage controller. The power control signal is used to enable or disable power distribution at a hard disk drive or another type of data storage device. In an embodiment of the present disclosure, the power control signal can be generated at a mid-plane of a data storage system. However, the disclosed devices, systems, and methods can be included at other types of information handling systems.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

A data storage system can include one or many data storage devices, such as hard disk drives, solid state drives, optical drives, and the like. A data storage system generally includes one or more data storage controllers, and one or more power supply units. A high-capacity data storage system can include a large number of storage devices, multiple storage controllers, and multiple power supply units. These components are often installed in a chassis, such as an equipment rack. An equipment rack provides a space-efficient enclosure and provides easy access to the components to facilitate replacement and maintenance. An equipment rack typically includes a bulkhead, also referred to as a mid-plane assembly, or simply a mid-plane. In an embodiment, the bulkhead can be located approximately midway between the front and the back sides of the equipment rack and can include electrical connectors configured to engage with corresponding connectors included on each device when the device is fully inserted into the chassis. For example, the mid-plane can include electrical receptacles to interface with power supplies, controllers, and other devices installed from one side of chassis, and additional electrical receptacles to interface with devices, such as hard disk drives installed from the opposite side of the chassis. Wiring within the mid-plane can communicate power and data signals between the devices, such as between disk drives installed at the front of the enclosure and data storage controllers installed at the rear of the enclosure.

FIG. 1 shows a data storage system 100 according to a specific embodiment of the present disclosure. The system 100 includes a data storage controller 110, a mid-plane assembly 120, and a data storage device 130. The mid-plane assembly includes a logic circuit 122 and status indicators 124 and 126. In an embodiment, the status indicators can include light-emitting diodes (LEDs). The data storage controller 110 is configured to receive data-read and data-write requests from one or more data processors (not shown at FIG. 1), the requests directing the data storage system to retrieve or store information at one or more data storage devices, such as the data storage device 130. The data storage controller 110 can include a compute engine or similar microprocessor-based computation device that is responsible for servicing data access requests and can be responsible for implementing failover procedures if a fault is detected in the data storage system 100. In addition, the data storage controller 110 can provide information indicating a status of one or more system functions. For example, the data storage controller 110 is configured to provide status information signals DRIVE ONLINE and DRIVE FAULT to the status indicators 124 and 126 at the mid-plane 120.

In an embodiment, the status indicators 124 and 126 can be located at a printed circuit board located at the mid-plane 120, and light-pipes can propagate light from the indicator to a location in proximity to a corresponding data storage device, such as the hard drive 130, to provide a visual indication of drive status to a technician. For example, the status signal DRIVE ONLINE is configured to illuminate the status indicator 124 to indicate that the hard drive 130 is operational. Similarly, the status signal DRIVE FAULT is configured to illuminate the status indicator 126 to indicate that the hard drive 130 has experienced a fault. In the embodiment illustrated at FIG. 1, power for illuminating the LEDs 124 and 126 is provided by the data storage controller 110. For example, the controller 110 can illuminate the LED 124 by driving the DRIVE ONLINE signal with a positive voltage, corresponding to a logic-high value. Similarly, the controller 110 can illuminate the LED 126 by driving the DRIVE FAULT signal with a positive voltage.

In the particular example illustrated at FIG. 1, the drive 130 can be in one of three operating modes: disabled, online, or faulted, but it cannot be both online and faulted. Therefore, the signal DRIVE ONLINE and the signal DRIVE FAULT are typically not asserted at the same time. As disclosed herein, a logic circuit can assert a power control signal in response to determining that the status signal DRIVE ONLINE and the status signal DRIVE FAULT are simultaneously asserted. The power control signal can be provided to a data storage device, such as the drive 130, for the purpose of enabling and disabling the distribution of electrical power to portions of the data storage device 130. In an embodiment, the power control signal corresponds to a POWER DISABLE signal as defined by the T10 Technical Committee of the International Committee on Information Technology Standards (INCITIS), and in particular as defined in the Serial Attached SCSI Protocol 3 (SAS-3) specification. For example, assertion of the POWER DISABLE signal can be configured to disable twelve-volt and five-volt power rails located within a hard drive, and thereby place the drive into a power-down condition.

During operation of the data storage system 100, the data storage controller can assert the signal POWER DISABLE to place the drive 130 into a power-down mode for the purpose of conserving electrical power during periods of time that the drive is not needed to store or retrieve data. Alternatively, the POWER DISABLE signal can be momentarily asserted to reset the drive 130. For example, the data storage controller can determine that the drive 130 has experienced a fault or is otherwise not operating correctly, and cycle power to the drive by asserting the POWER DISABLE signal for an interval of time.

The logic circuit 122 is configured to perform a logical-AND function. For example, the logic circuit 122 can assert the signal POWER DISABLE if the signal DRIVE ONLINE and the signal DRIVE FAULT are both asserted. Assertion of the signal POWER DISABLE causes the drive 130 to transition into the power-down mode. The signal POWER DISABLE is de-asserted in response to de-asserting one or both of the signals DRIVE ONLINE and DRIVE FAULT, which causes the drive to resume a normal mode of operation.

Figure 2:
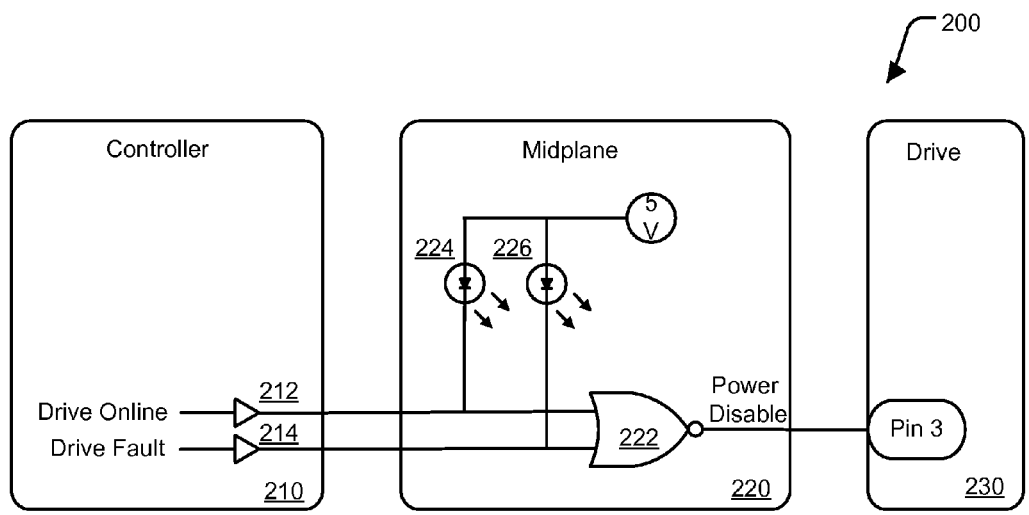
FIG. 2 is a block diagram illustrating a data storage system according to another embodiment of the present disclosure.

FIG. 2 shows a data storage system 200 according to another embodiment of the present disclosure. The system 200 includes a data storage controller 210, a mid-plane assembly 220, and a data storage device 230. The mid-plane assembly 220 includes a logic circuit 222 and status indicators 224 and 226. Operation of the system 200 is similar to the operation of the system 100 described above with one exception. Instead of sourcing a logic-high voltage level to assert signals DRIVE ONLINE and DRIVE FAULT, assertion of signals DRIVE ONLINE and DRIVE FAULT corresponds to a sinking of current, by the controller 210, at corresponding signal terminals. During operation, sinking current at the terminal corresponding to the signal DRIVE ONLINE causes the LED 224 to illuminate and sinking current at the terminal corresponding to the signal DRIVE FAULT causes the LED 226 to illuminate. The logic circuit 222 is configured to perform a logic-NOR function, and the signal POWER DISABLE is asserted if the controller configures the terminals corresponding to the signal DRIVE ONLINE and to the signal DRIVE FAULT to simultaneously sink current. Assertion of the signal POWER DISABLE causes the drive 230 to transition into the power-down mode of operation, as described above.

Figure 3:
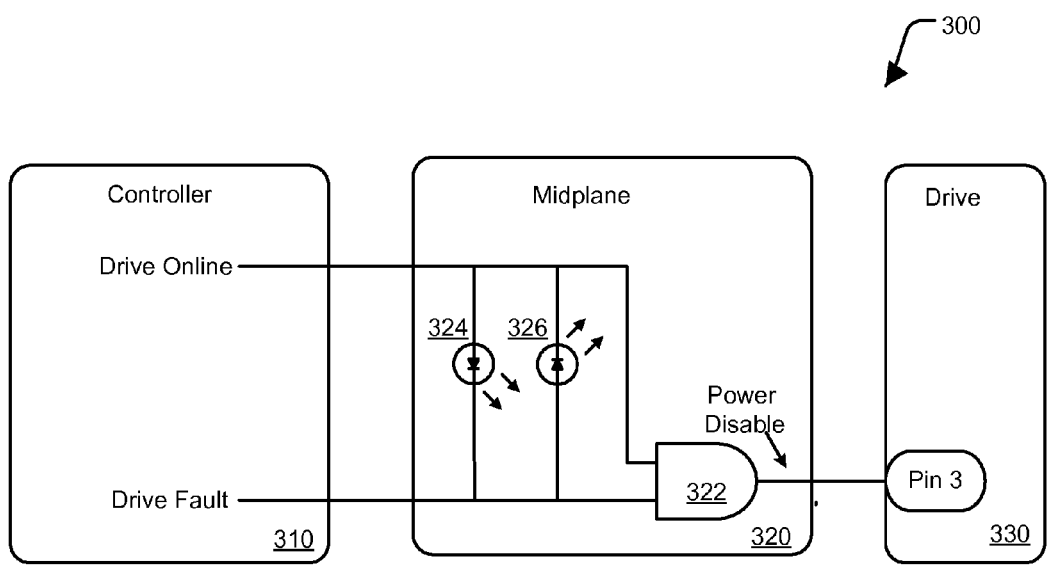
FIG. 3 is a block diagram illustrating a data storage system according to still another embodiment of the present disclosure.

FIG. 3 shows a data storage system 300 according to yet another embodiment of the present disclosure. The system 300 includes a data storage controller 310, a mid-plane assembly 320, and a data storage device 330. The mid-plane assembly 320 includes a logic circuit 322 and status indicators 324 and 326. Operation of the system 300 is similar to the operation of the system 100 described above, except the signals DRIVE ONLINE and DRIVE FAULT are configured to illuminate one or another of indicators 324 and 326 in response to a difference between the logic state of the two status signals. For example, if the data storage controller asserts the signal DRIVE ONLINE by sourcing a voltage level corresponding to a logic-high value and de-asserts the signal DRIVE FAULT by sourcing a voltage level corresponding to a logic-low value, the LED indicator 324 is illuminated. Similarly, the LED indicator 326 can be illuminated by asserting the signal DRIVE FAULT and de-asserting the signal DRIVE ONLINE. However, if the data storage controller 310 sources a logic-high voltage level at both of the status signals, the signal POWER DISABLE is asserted but neither of the status indicators 324 and 326 is illuminated. As described above, assertion of the signal POWER DISABLE causes the drive 330 to transition into a power-down mode. The data storage controller 310 can signal the drive 330 to resume normal operation by de-asserting one or both of the status signals.

Figure 4:
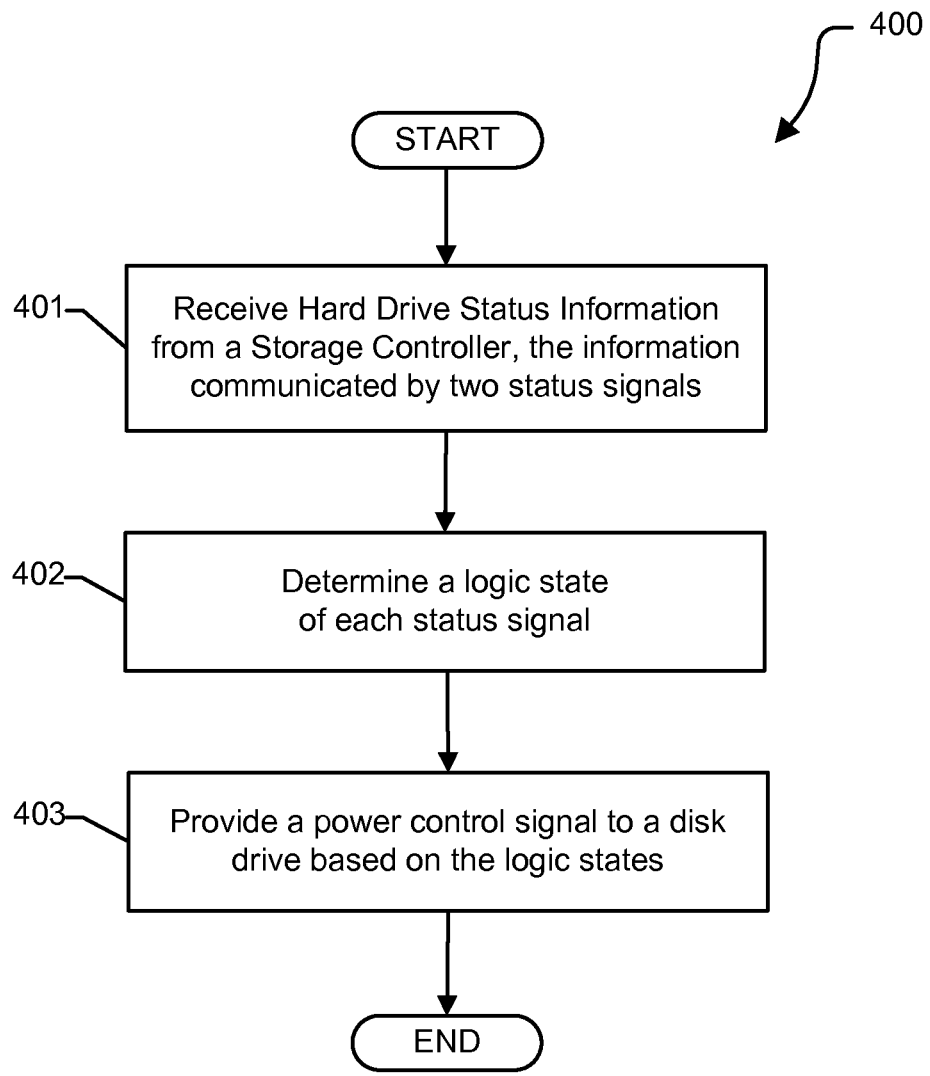
FIG. 4 is a flow diagram illustrating a method for providing a power control signal to a data storage device according to a specific embodiment of the present disclosure.

FIG. 4 shows a method 400 for providing a power control signal to a data storage device according to a specific embodiment of the present disclosure. The method 400 begins at block 401 where hard drive status information is received from a data storage controller, the information communicated by two status signals. For example, the data storage controller 110 of FIG. 1 can provide the status signal DRIVE ONLINE and the status signal DRIVE FAULT to the mid-plane 120 of the data storage system 100. The method continues at block 402 where a logic state of each status signal is determined. For example, the logic circuit 122 is configured to receive the status signal DRIVE ONLINE and the status signal DRIVE FAULT at corresponding inputs and provide the signal POWER DISABLE at an output. The method continues at block 403 where the power control signal is provided to a disk drive, the value of the power control signal based on the logic state of each signal. For example, the logic circuit 122 can assert the signal POWER DISABLE if each of the status signals is asserted. The drive 130 is configured to enable or disable distribution of power to portions of the drive 130 based on the logic value of the signal POWER DISABLE.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
receiving information from a data storage controller, the information indicating status of a data storage device, the information communicated by a first status signal indicating when asserted that the data storage device is online and by a second status signal indicating when asserted that the data storage device has experienced a fault, wherein the first status signal and the second status signal are provided to a visual status indicator; and
asserting a power control signal to remove power from the data storage device in response to determining that the first status signal is asserted and that the second status signal is asserted.

2. The method of claim 1, wherein the power control signal is to enable and disable distribution of power at the data storage device.

3. The method of claim 1, wherein providing a power control signal to a data storage device further comprises providing the power control signal to pin-three of a drive plug connector according to T10 Technical Committee of the International Committee on Information Technology Standards.

4. The method of claim 1, wherein the determining is performed at a mid-plane of a data storage system.

5. The method of claim 1, wherein simultaneous assertion of the first status signal and the second status signal indicates mutually exclusive operating conditions of the data storage device.

6. The method of claim 1, wherein the status information comprises selectively sinking a current at the data storage controller and the power control signal is asserted if the first status signal and the second status signal are each at a logic-low value.

7. The method of claim 1, wherein the first status signal is coupled to a first terminal of a status LED and the second status signal coupled to a second terminal of the status LED and the power control signal is asserted if the first status signal and the second status signal are each at a logic-high value.

8. The method of claim 1, wherein the first status signal is to illuminate a first indicator and the second status signal is to illuminate a second indicator.

9. A data storage system comprising:
a data storage controller;
a data storage device coupled to the data storage controller; and
a logic circuit to:
receive hard drive status information from the data storage controller, the information indicating status of the data storage device, the information communicated by a first status signal indicating when asserted that the data storage device is online and a second status signal indicating when asserted that the data storage device has experienced a fault, wherein the first status signal and the second status signal are provided to a visual status indicator; and
asserting a power control signal to remove power from the data storage device in response to the determining that the first status signal is asserted and that the second status signal is asserted.

10. The data storage system of claim 9, wherein the power control signal is to enable and disable distribution of power at the data storage device.

11. The data storage system of claim 9, wherein simultaneous assertion of the first status signal and the second status signal indicates mutually exclusive operating conditions of the data storage device.

12. The data storage system of claim 9, wherein providing a power control signal to a data storage device further comprises providing the power control signal to pin-three of a drive plug connector according to T10 Technical Committee of the International Committee on Information Technology Standards.

13. The data storage system of claim 9, wherein the determining is performed at a mid-plane of the data storage system.

14. The data storage system of claim 9, further comprising a first indicator and a second indicator, wherein the first status signal is to illuminate the first indicator and the second status signal is to illuminate the second indicator.

15. A device comprising:
a first input to receive a first data storage device status signal from a data storage controller, the first status signal indicating when asserted that a data storage device is online;
a second input to receive a second data storage device status signal from the data storage controller, the second status signal indicating when asserted that the data storage device has experienced a fault, wherein the first status signal and the second status signal are provided to a visual status indicator; and
a first output for providing a power control signal to a data storage device, a logic state of the power control signal determined based on a logic state of the first signal and a logic state of the second signal.

16. The device of claim 15, wherein the power control signal is to enable and disable distribution of power at the data storage device.

17. The device of claim 15, wherein the power control signal is asserted in response to determining that the first status signal is asserted and that the second status signal is asserted, and wherein assertion of the power control signal is to remove power from the data storage device.

18. The device of claim 15, wherein the device is included at a mid-plane of a data storage system.

19. The device of claim 15, wherein simultaneous assertion of the first status signal and the second status signal indicates mutually exclusive operating conditions of the data storage device.

20. The method of claim 1, wherein assertion of the first status signal indicates that the data storage device is operational.

* * * * *